(12) United States Patent  
Matsumoto et al.

(10) Patent No.: US 6,302,716 B1
(45) Date of Patent: *Oct. 16, 2001

(54) ROTATABLE CONNECTOR

(75) Inventors: Mitsunori Matsumoto; Hiroyuki Bannai; Takehiko Ito; Nobuo Matsuzaki, all of Miyagi-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/113,458

(22) Filed: Jul. 10, 1998

(30) Foreign Application Priority Data

Jul. 10, 1997 (JP) .................................................. 9-185389

(51) Int. Cl.⁷ .................................................. H01R 35/04
(52) U.S. Cl. .............................................................. 439/164
(58) Field of Search ........................................ 439/164, 15

(56) References Cited

U.S. PATENT DOCUMENTS 5,413,492  5/1995  Obata ....................................... 439/64
5,882,216 * 3/1999 Matsumoto et al. ................. 439/164

FOREIGN PATENT DOCUMENTS 0695 000 A2  6/1995  (EP) .
0 695 000 A2  1/1996  (EP) .

* cited by examiner

Primary Examiner—Gary Paumen
(74) Attorney, Agent, or Firm—Brinks Hofer Gilson & Lione

(57) ABSTRACT

A rotatable connector in which a moving body provided with first and second openings are rotatably arranged within a storage section defined between a stationary housing having an outer cylindrical wall and a movable housing having an inner cylindrical wall; and the width $W_1$ of the first opening and the width $W_2$ of the second opening are set as $W_1<W_2$. The first and second flat cables with both ends thereof fixed on the peripheral surfaces of the outer cylindrical wall and the inner cylindrical wall are wound within the storage section. The turned-back portions of the flat cables are routed through the first and second openings, with the inner end of the first flat cable directly wound around the peripheral surface of the inner cylindrical portion and with the inner end of the second flat cable also wound on the inner cylindrical portion through about one turn of the flat cable, thereby changing the winding diameter of the flat cables in relation to the inner cylindrical portion.

27 Claims, 6 Drawing Sheets

ROTATABLE CONNECTOR

BACKGROUND OF THE INVENTION

1. Field of the Invention

The present invention relates to a rotatable connector mounted in a steering system of an automobile for use as an electrical connecting means of an air bag system and, more particularly, to a rotatable connector in which flat cables are reversely wound through a turned-back portion within a housing section defined between a stationary housing and a movable housing.

2. Description of the Prior Art

The rotatable connector has flat cables which are housed and wound between a stationary housing and a movable housing rotatably mounted on the stationary housing, and is used as an electrical connecting means of an air bag inflator or other built in a steering wheel which is mounted on a steering system of an automobile and rotated by a limited number. The flat cable is a strip-like body having a plurality of conductors. There have been known two types of flat cables: one wound in a spiral form and the other turned back halfway to an opposite direction; and the latter, or the turned-back type, can be made substantially shorter than the former.

In the turned-back rotatable connector, a single flat cable is usually employed. However, when the number of conductors increases with adoption of multiple circuits, the flat cable increases in width with the number of the conductors, thereby preventing a decrease in the thickness of the whole body of the rotatable connector. According to the rotatable connector disclosed in the specification of U.S. Pat. No. 3,763,455, however, the conductors are divided into the two flat cables to thereby meet the adoption of the multiple circuits.

FIG. 6 is a plan view schematically showing the constitution of a cable reel disclosed in the above-described patent specification. As shown in FIG. 6, a movable housing 101 having an inner cylindrical portion is rotatably connected to a stationary housing 100 having an outer cylindrical portion. A first flat cable 103 and a second flat cable 104 are inserted in an annular housing section 102 defined between the stationary housing 100 and the movable housing 101. These flat cables 103 and 104 are arranged, in opposite winding directions, in the outer cylindrical portion of the stationary housing 100 and in the inner cylindrical portion of the movable housing 101 in the housing section 102. U-shaped turned-back portions 103a and 104a are formed in a position where the winding direction is changed. The inner ends of both the flat cables 103 and 104 are connected to cable exit portions 107 and 108 disposed adjacently to the inner cylindrical portion of the movable housing 101, and led out of the movable housing 101 through the cable exit portions 107 and 108. On the other hand, the outer ends of both the flat cables 103 and 104 are connected to cable exit portions 109 and 110 located adjacently to the outer cylindrical portion of the stationary housing 100, being let out of the stationary housing 100 through the cable exit portions 109 and 110. Furthermore, in the housing section 102 are arranged a plurality of roller groups 105 and 106 along the circumferential direction thereof. The turned-back portion 103a of the first flat cable 103 is coiled around one of rollers in the roller group 105, while the turned-back portion 104a of the second flat cable 104 is coiled around one of rollers in the other roller group 106.

In the rotatable connector thus constituted, when for instance the movable housing 101 is turned clockwise in FIG. 6, the turned-back portions 103a and 104a of the flat cables 103 and 104 move clockwise within the housing section 102 by a less amount of rotation than the movable housing 101, thus winding the flat cables 103 and 104 more on the inner cylindrical portion side of the movable housing 101. Conversely, when the movable housing 101 is turned counterclockwise in FIG. 6, the turned-back portions 103a and 104a of the flat cables 103 and 104 move in the same direction by a less amount of rotation than the movable housing 101; that is, the flat cables 103 and 104 are unwound, thus being wound much on the outer cylindrical portion side of the stationary housing 100. The rollers 105 and 106 are moved in the same direction by a force from the turned-back portions 103a and 104a of the flat cables 103 and 104 at the time of winding and unwinding.

In the prior art rotatable connector described above the radial deformation of the flat cables 103 and 104 is restricted by a plurality of roller groups 105 and 106, and therefore the flat cables 103 and 104 can be smoothly moved in the circumferential direction of the housing section 102. However, since the plurality of roller groups 105 and 106 are separately arranged within the housing section 102, the roller groups 105 and 106 hit against each other, producing a sound of collision, when the rotatable connector vibrates, resulting in lowered assembling operation performance.

It is, therefore, conceivable to adopt such a structure that a moving body 111 having at least a couple of openings 111a and 111b is rotatably disposed inside the housing section 102 in place of the use of the mutually independent roller groups 105 and 106 as shown in FIG. 7, and the turned-back portions 103a and 104a of the flat cables 103 and 104 are arranged through the openings 111a and 111b. The moving body 111 is comprised of a ring-like rotary disk 112 and a plurality of roller groups 113 axially supported on the rotary disk 112, and the openings 111a and 111b are formed, equally spaced between these roller groups 113. Therefore, when the moving body 111 having the openings 111a and 111b is used, the rotary disk 112 and the roller groups 113 can be handled as one body and can prevent the collision of the roller groups 113. The aforesaid problem inherent to the prior art rotatable connector can be solved, but a later-described new problem will arise.

That is, in the above-described rotatable connector, let D be the diameter of the inner cylindrical portion of the movable housing 101 and t be the thickness of the flat cables 103 and 104, and the winding diameter of the first flat cable 103 directly wound on the inner cylindrical portion is D and the winding diameter of the second flat cable 104 wound on the inner cylindrical portion via about one turn of the first flat cable 103 becomes (D+2t). In this case, the flat cables 103 and 104 differ in winding diameter. Therefore, when the movable housing 101 is turned, the length of the flat cables 103 and 104 wound on the inner cylindrical portion, or the length of these flat cables unwound from the inner cylindrical portion, varies, with the result that the turned-back portion 104a of the second flat cable 104 having a large winding diameter moves faster than the turned-back portion 103a of the first flat cable 103 having a small winding diameter. Consequently, for instance when the flat cables 103 and 104 are fed out from the inner cylindrical portion and wound on the outer cylindrical portion as illustrated, the turned-back portion 104a of the second flat cable 104 contacts the roller 113 which is disposed at the end of the opening 111b. In this case, however, the turned-back portion 103a of the first flat cable 103 which moves at a slow speed moves only in the opening 111a and does not contact the roller 113 Therefore there arises such a problem that the moving body 111 cannot smoothly be moved by the force from the turned-back portions 103a and 104a.

The present invention, therefore, has an object to provide a rotatable connector in which a moving body disposed in a housing section has a plurality of openings through which turned-back portions of a plurality of flat cables pass, and at least one of the openings is set less in width along the peripheral direction than the other. If the openings of the moving body are all different in width, and if the opening for the turned-back portion of flat cable wound in a small diameter is set narrower than that for the turning portion of the flat cable wound in a large diameter, the turned-back portion of each flat cable can act on the moving body at the time of winding and unwinding, thereby allowing the moving body to move smoothly within the housing section.

SUMMARY OF THE INVENTION

The rotatable connector of the present invention comprises a first housing having an outer cylindrical portion, a second housing rotatably mounted to the first housing and having an inner cylindrical portion oppositely to the outer cylindrical portion through an annular storage section, a plurality of flat cables turned back halfway to be wound reversely in the storage section, with its both ends secured to the outer cylindrical portion and the inner cylindrical portion respectively, and a moving body rotatably arranged within the storage section and having a plurality of openings through which the turned-back portion of each flat cable passes, so that at least one of the flat cables may be set shorter in width along the peripheral direction of each opening than the other.

The moving body serves to prevent diametrical deformation of each flat cable within the housing section; for instance, it is possible to adopt the constitution that a plurality of roller groups are supported on a rotary disk; in this case there is formed an opening between a pair of rollers. Also, it is possible to replace some of the roller groups with a stationary tube and to form an opening between the stationary tube and the opening.

Where the number of the flat cables is N, the moving body requires the N number of openings. When the openings are formed at an equal spacing along the peripheral direction of the moving body, that is, arranged at about 360/N degrees, a force from the turned-back portion of each flat cable can be applied uniformly to the moving body.

Furthermore, the structure of connection with an external connector can be simplified by the provision, in the inner cylindrical portion, of a joint at which one ends of the flat cables will be collected, and by leading the one ends of the flat cables out of the second housing through the joint.

Furthermore, where a cable retaining portion located outside of the turned-back portion of the flat cables arranged through the opening is provided at the end in the diametrical direction of the opening having the largest width along the peripheral direction, it is possible to fully prevent undesirable deformation, in a large opening, of the flat cables wound inside and outside of the moving body, particularly the inner flat cable, by means of the cable retaining portion.

Furthermore, where a similar cable retaining portion is provided also at the end in the diametrical direction of the opening having the smallest width along the peripheral direction, and is set smaller in width along the peripheral direction than the cable retaining portion in the opening having the largest width along the peripheral direction, it is possible to fully prevent flat cable deformation through the entire surface of the moving body.

Furthermore, where a rotatable roller and a fixed post are provided oppositely to the moving body through the opening and the turned-back portion of the flat cable is coiled around the roller, a pressure from the turned-back portion is reliably transmitted to the moving body through the fixed post, to thereby enable the moving body to turn smoothly within the housing section. Providing the cable retaining portion integrally with the fixed post can insure effective operation of the rotatable connector.

DESCRIPTION OF THE PREFERRED EMBODIMENTS

Figure 1:
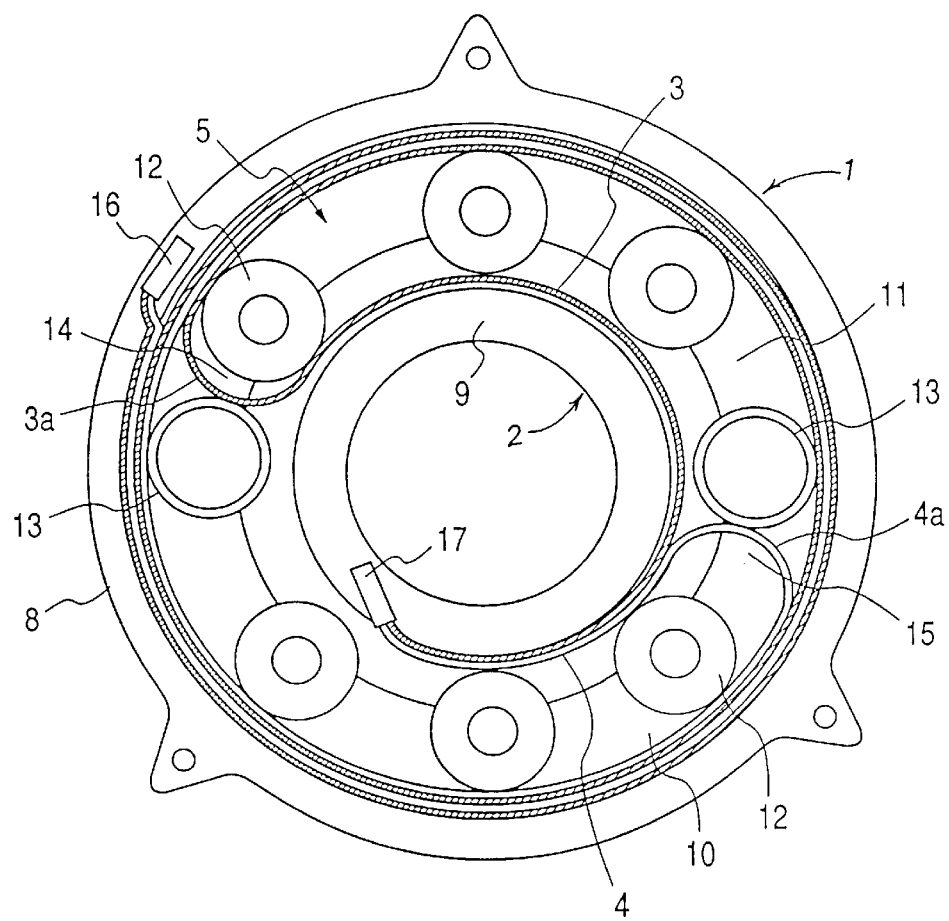
FIG. 1 is a plan view of one embodiment of a rotatable connector according to the present invention.
Figure 2:
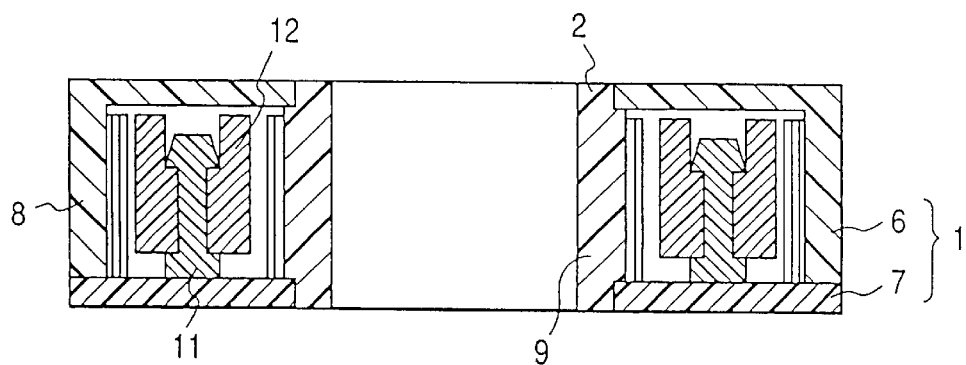
FIG. 2 is a sectional view of the rotatable connector.
Figure 3:
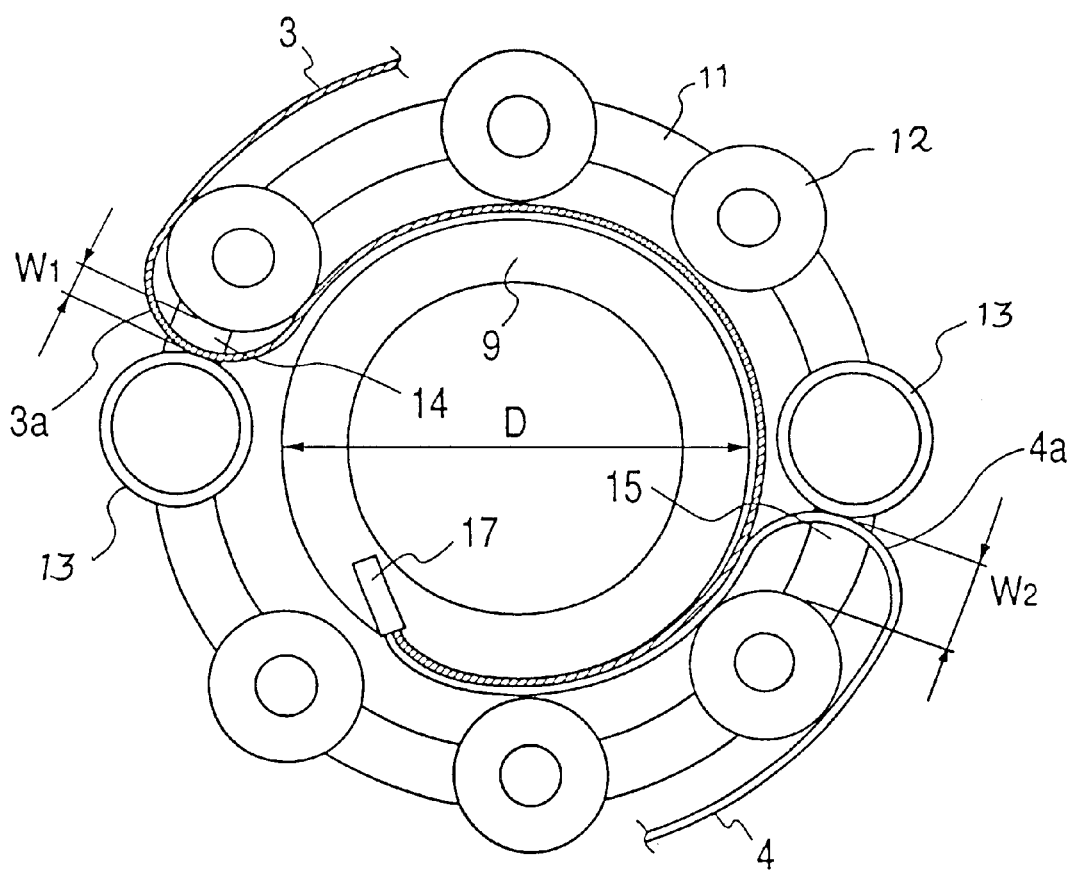
FIG. 3 is an explanatory view showing a major portion of the rotatable connector.

Preferred embodiments of a rotatable connector of the present invention will be described by referring to the accompanying drawings. FIG. 1 is a plan view of one embodiment of the rotatable connector according to the present invention; FIG. 2 is a sectional view of the rotatable connector; and FIG. 3 is an explanatory view showing a major portion of the rotatable connector. The rotatable connector of the present embodiment is, as shown in these drawings, comprised roughly of a stationary housing 1, a movable housing 2 rotatably connected to the stationary housing 1, first and second flat cables 3 and 4 arranged between the housings 1 and 2, and a moving body rotatably interposed between the housings 1 and 2.

The stationary housing 1 is comprised of an upper case 6 and a lower case 7 which are unitarily formed; on the upper case 7 is formed an outer cylindrical portion 8. On the other hand, on the movable housing 2 is formed a cylindrical inner cylindrical portion 9. The outer cylindrical portion 8 and the inner cylindrical portion 9 are co-axially arranged. Between these two tube portions 8 and 9 is defined an annular storage section 10. A moving body 5 is disposed within the storage section 10. The moving body 5 includes a ring-shaped rotary disk 11, a plurality of roller 12 groups supported on the rotary disk 11, and a pair of stationary tubes 13 serving as fixed posts. Between one of the stationary tubes 13 and the roller 12, a first opening 14 is formed. Also between the other stationary tube 13 and the roller 12, a second opening 15 is formed. These openings 14 and 15 are diametrically located, that is, about 180 degrees apart. Let $W_1$ be the width of the first opening 14 in the circumferential direction and $W_2$ be the width of the second opening 15 in the circumferential direction, and the relationship between these widths will be $W_1 < W_2$ as shown in FIG. 3.

Either of the first and second flat cables 3 and 4 is a strip-like body comprising a plurality of conductors of copper extended on one side of a ground film made of an insulating tape such as PET. In the drawings, a hatched cable indicates the first flat cable 3, while a white cable, the second flat cable 4 for convenience. The outer ends of these flat cables 3 and 4 are connected to a stationary joint 16 fixed on the outer cylindrical portion 8, and are electrically led out of the stationary housing 1 through the stationary joint 16. The inner ends of the flat cables 3 and 4 are connected to the movable joint 17 fixed on the inner cylindrical portion 9 and electrically led out of the movable housing 2 through the movable joint 17. At this time the flat cables 3 and 4 are wound counterclockwise along the inside wall of the outer cylindrical portion 8 from the stationary joint 16 with the first flat cable 3 placed on the outer side, and then are branched off; the first flat cable 3 passes through the first opening 14, being turned back into a U shape (hereinafter called the turned-back portion 3a) to be coiled around one of the roller 12 groups, while the second flat cable 4 passes through the second opening 15, being turned back into a U shape to be coiled around another of the roller 12 groups (hereinafter called the turned-back portion 4a). Furthermore, the second flat cable 4, placed on the outer side, is wound clockwise on the peripheral surface of the inner cylindrical portion 9, then being stowed in the storage section 10 so as to come to the movable joint 17.

Therefore the inner end of the first flat cable 3 is directly wound around the peripheral surface of the inner cylindrical portion 9; however, the inner end of the second flat cable 4 is wound by about one turn around the inner cylindrical portion 9 through the first flat cable 3. That is, when D is the diameter of the inner cylindrical portion 9 of the movable housing 2 and t is the thickness of the flat cables 3 and 4, the winding diameter of the first flat cable 3 becomes D and the winding diameter of the second flat cable 4 becomes (D+2t); therefore, the winding diameter of the second flat cable 4 wound on the inner cylindrical portion 9 is larger than that of the first flat cable 3. The widths $W_1$ and $W_2$ of the first and second openings 14 and 15 are designed with the above-described taken into consideration. That is, the width $W_1$ of the first opening 14 through which the turned-back portion 3a of the first flat cable 3 of small winding diameter passes is smaller than the width $W_2$ of the second opening 15 through which the turned-back portion 4a of the second flat cable 4 having a large winding diameter passes.

Next, operation of the rotatable connector of the above-described embodiment will be described. In this case, the stationary housing 1 is secured to a stator member of a steering system, and an unillustrated external connector on the vehicle body side is connected to the stationary joint 16. The movable housing 2 is secured to a steering wheel which is a rotary member of the steering system, and an unillustrated external connector on the steering wheel side is connected to the movable joint 17.

When, during operation, the steering wheel is turned clockwise or counterclockwise, the turning effort is transmitted to the movable housing 2, which is thus turned clockwise or counterclockwise. For example, when the movable housing 2 is steered counterclockwise from neutral position, the turned-back portions 3a and 4a of the first and second flat cables 3 and 4 move counterclockwise by a smaller amount of rotation than the movable housing 2, and the moving body 5 follows the turned-back portions 3a and 4a, moving counterclockwise. As a result, the flat cables 3 and 4 are fed out by about twice as long as the counter-clockwise movement from the inner cylindrical portion 9 side, being wound on the outer cylindrical portion 8 side. That is, the flat cables 3 and 4 are in an unwound state. In this case, the turned-back portion 4a of the second flat cable 4 having a large winding diameter moves faster than the turned-back portion 3a of the first flat cable 3 having a small winding diameter. However, since the widths of the openings 14 and 15 are set $W_1 < W_2$ as previously stated, the turned-back portions 3a and 4a push the stationary tube 13 located on one end of the openings 14 and 15, and accordingly the moving body 5 receives a force from the turned-back portions 3a and 4a to move smoothly within the storage section 10.

Conversely to the above-described, when the movable housing 2 turns clockwise from the neutral position of the steering wheel, the turned-back portions 3a and 4a of the flat cables 3 and 4 move clockwise by a smaller amount of rotation than the movable housing 2, and accordingly the moving body 5, following the movement of the turned-back portions 3a and 4a, moves clockwise. Consequently, the flat cables 3 and 4 about twice as long as the amount of movement of the turned-back portions 3a and 4a are fed out from the outer cylindrical portion 8, being wound on to the inner cylindrical portion 9. That is, the flat cables are in a wound state. In this case also, the turned-back portion 4a of the second flat cable 4 having a large winding diameter moves faster than the turned-back portion 3a of the first flat cable 3 having a small winding diameter. However, since the widths of the openings 14 and 15 are set to $W_1 < W_2$, the turned-back portions 3a and 4a pull the roller 12 located on the other end of the openings 14 and 15, and accordingly the moving body 5 receives a force from the turned-back portions 3a and 4a, thus smoothly moving within the housing section 10.

In the above-described embodiment, the widths $W_1$ and $W_2$ of the first and second openings 14 and 15 where the turned-back portions 3a and 4a of the flat cables 3 and 4 pass through vary with a difference in the winding diameter of the two flat cables 3 and 4 on the inner cylindrical portion 9. During the rotation of the movable housing 2, therefore, the moving body 5 is driven to turn primarily by the turned-back portion 4a of the flat cable 4 having a large winding diameter. However, since the turned-back portion 3a of the first flat cable 3 also contacts the end of the first opening 14 during rotation, and accordingly the force from the turned-back portions 3a and 4a of the flat cables 3 and 4 can be applied to the moving body 5, and particularly since the first and second openings 14 and 15 are formed in diametrical positions, or 180 degrees apart, of the moving body 5, it is possible to smoothly move the moving body. Furthermore, because the inner ends of the flat cables 3 and 4 are collected to one place at the movable joint 17, the structure of connection to the external connector on the steering wheel side can be simplified.

Figure 4:
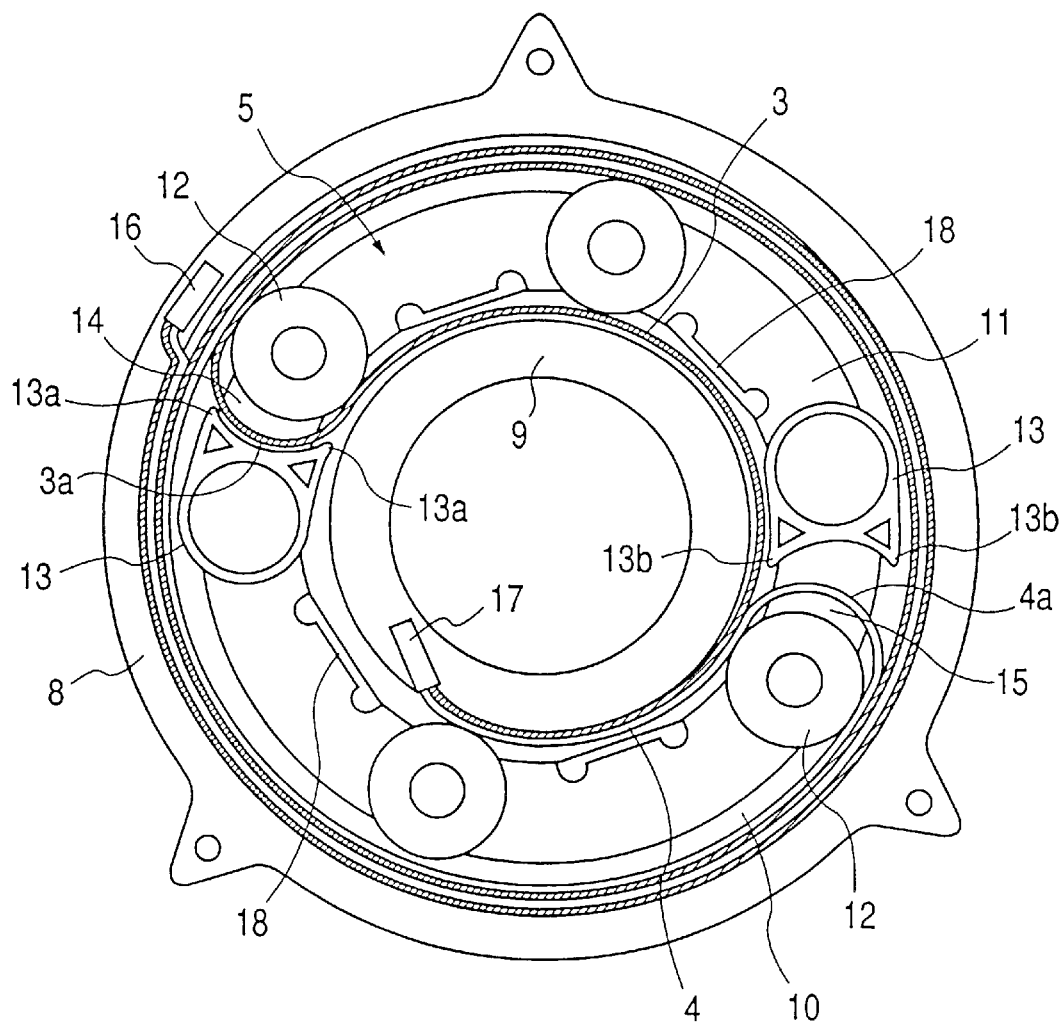
FIG. 4 is a plan view of another embodiment of the rotatable connector according to the present invention.

FIG. 4 is a plan view of another embodiment of the rotatable connector according to the present invention; in FIG. 4, the same members as those in FIGS. 1 to 3 are designated by the same reference numerals.

In the present embodiment, a cable retaining portion 13a is protrusively formed on both ends in the diametral direction of the stationary tube 13 facing the roller 12 through the first opening 14; and also the cable retaining portion 13b is protrusively formed on both ends in the diametral direction of the stationary tube 13 facing the roller 12 through the second opening 15. Another embodiment is presented in FIG. 5, wherein the latter cable retaining portion 13b is set longer than the former cable retaining portion 13a. And particularly, of these cable retaining portions 13b, the inner cable retaining portion 13b' is extended for the purpose of fully decreasing a gap inside the second opening 15. Furthermore, a plurality of cable restricting walls 18 are provided on the inner peripheral edge of the rotary disk 11. The cable restricting walls 18 are disposed between the rollers 12 and between the rollers 12 and the stationary tubes 13 except the first and second openings 14 and 15.

The rotatable connector thus constituted operates basically in the same manner as the aforementioned embodiment and therefore will not be explained in order to prevent redundancy. The rotatable connector, however, has the following advantage that, notwithstanding different winding diameters between the two flat cables 3 and 4 wound on the inner cylindrical portion 9, the force from the turned-back portions 3a and 4a can be reliably applied to the moving body 5. Therefore the cable retaining portion 13b, being protrusively formed on both ends in the diametrical direction of the second opening 15, can prevent undesirable deformation, in the wide second opening 15, of the first flat cable 3 which passes inside and outside of the second opening 15 while maintaining the above-described advantage. Particularly, since the inner cable retaining portion 13b is sufficiently long in relation to the first flat cable 3 which is located inside and is liable to be deformed, it is possible to reliably prevent deformation of the first flat cable 3. Also, since the first opening 14 has a smaller width in the circumferential direction in relation to the second opening 15, the second flat cable 4 which passes inside and outside of the first opening 14 is less liable to be undesirably deformed. However, as the cable retaining portion 13a is formed protrusively on both ends along the diametrical direction of the first opening 14, it is also possible to prevent deformation of the second flat cable 4. Furthermore, a plurality of cable restricting walls 18 provided on the inner peripheral edge of the rotary disk 11 excepting the first and second openings 14 and 15 can prevent, in association with the aforesaid cable retaining portions 13a and 13b, the deformation of the flat cables 3 and 4 throughout the moving body 5.

In the embodiments described above, the rotatable connector using a couple of flat cables has been described. It should be noted, however, that the present invention is applicable also to a rotatable connector using at least three flat cables. In this case, the width of the plurality of openings where the turned-back portion passes through may be set as desired in accordance with a difference in the winding diameter of each flat cable in relation to the inner cylindrical portion.

The present invention, therefore, has the following advantage when worked as heretofore described.

The moving body disposed in the housing section is provided with a plurality of openings through which the turned-back portions of a plurality of flat cables pass; and with the width of at least one of the openings in the circumferential direction being smaller than the others, it is possible to apply a force from the plurality of turned-back portions to the moving body if the turned-back portions of the flat cables move at different speeds during a winding or unwinding stroke because of a difference in the winding diameter, thus enabling smooth movement of the moving body.

Furthermore, it is possible to uniformly apply the force from the turned-back portions of the flat cables to the moving body by providing the openings at equal intervals along the circumferential direction of the moving body.

Furthermore, it is possible to simplify the connecting structure for connection with an external connector by providing a joint in one place in the inner cylindrical portion where one end of each flat cable is collected, and by leading the one end of each flat cable out of the second housing through the joint.

Figure 5:
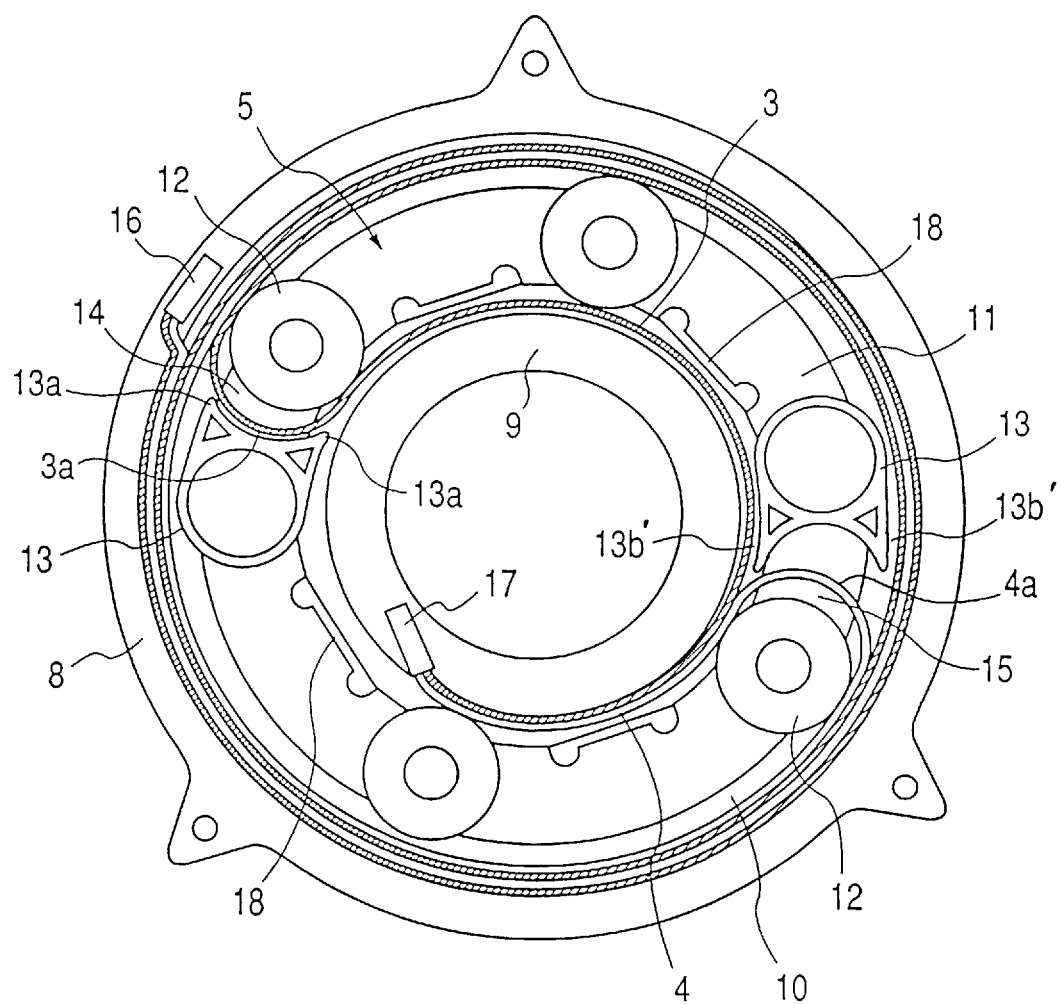
FIG. 5 is a plan view of another embodiment of the rotatable connector according to the present invention.
Figure 6:
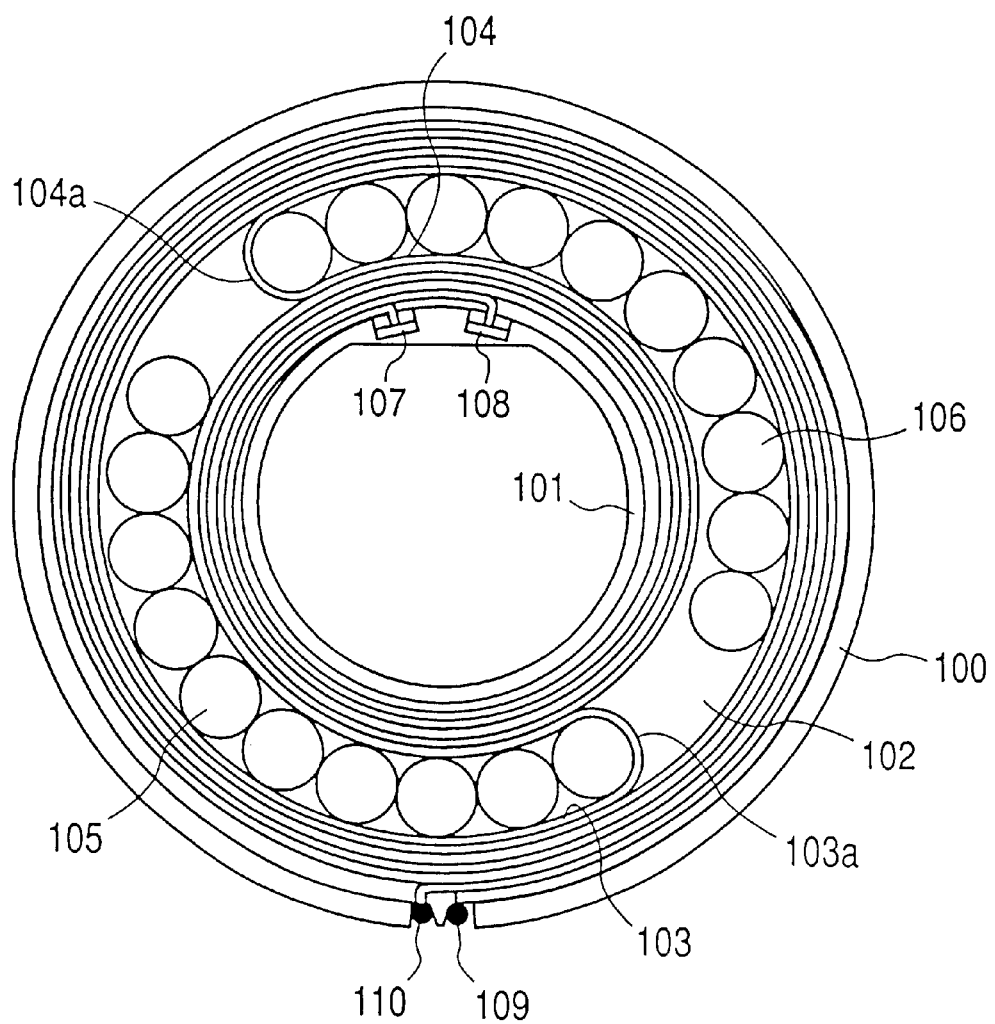
FIG. 6 is a plan view of a prior art rotatable connector.
Figure 7:
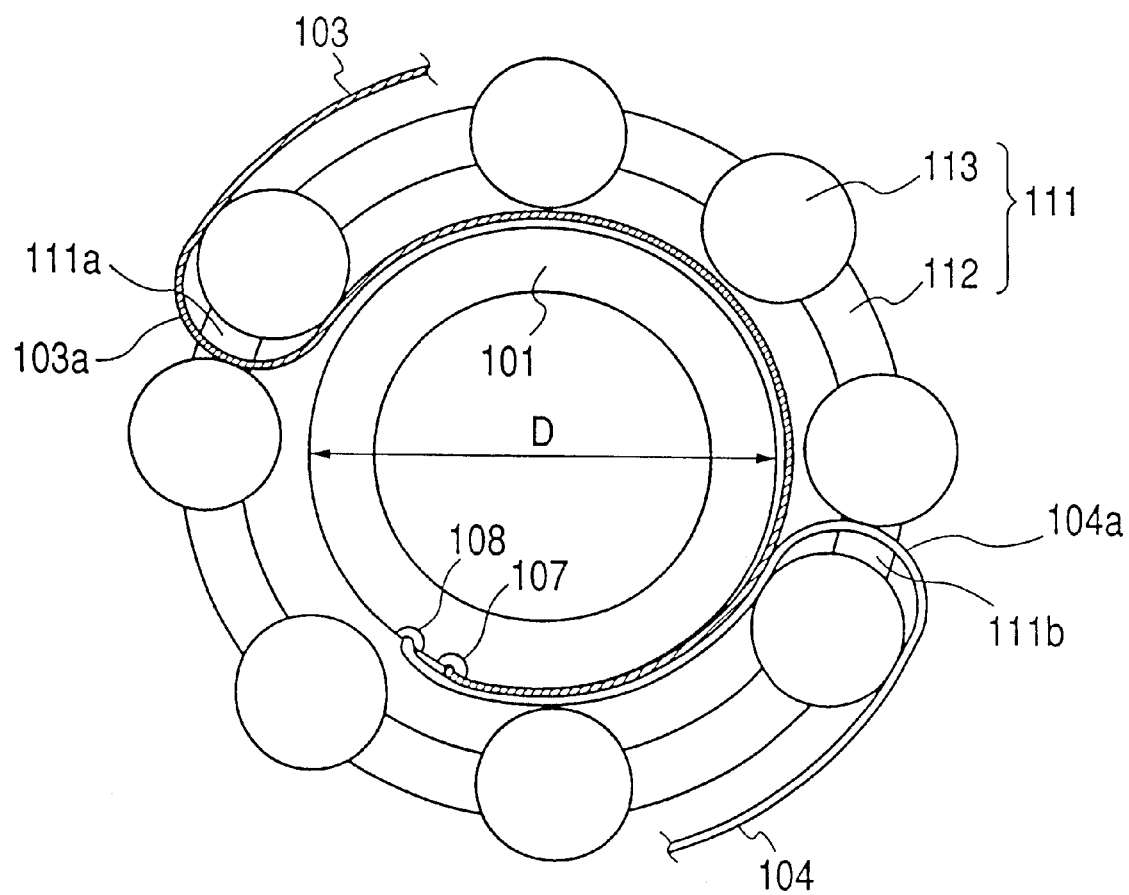
FIG. 7 is an explanatory view of a rotatable connector proposed in a prior art invention.

Furthermore, as presented in FIG. 5, where the moving body 2 comprises a cable retaining portion 13b located within said second opening 15 in a position outside of the turned-back portion 4a of the flat cable 4, it is possible to fully prevent undesirable deformation, in a large opening, of the flat cables wound inside and outside of the moving body, particularly the inner flat cable, by means of the cable retaining portion.

Furthermore, as presented in FIG. 5, it is possible to prevent flat cable deformation through the entire circumference of the moving body by providing a cable retaining portion 13a within said first opening 14 in a position outside of said turned-back portion 3a of said cable 3, said cable retaining portion 13a within said first opening 14 being smaller than said cable retaining portion 13b within said second opening 15.

Furthermore, where there are provided a rotatable roller and a fixed post oppositely to the moving body through the opening, and the turned-back loop portion of the flat cable is coiled around the roller, the pressure from the turned-back portion can be reliably transmitted to the moving body through the fixed post and also the moving body can smoothly turn within the housing section. In this case, a higher effect can be achieved by providing the cable retaining portion integrally with the fixed post.

While the preferred embodiments of this rotatable connector has been disclosed, it will be appreciated that various modifications may be made without departing from the spirit and scope of the present invention.

What is claimed is:

1. A rotatable connector comprising;
   a first housing having an outer cylindrical portion;
   a second housing rotatably attached on said first housing and having an inner cylindrical portion arranged co-axially with said outer cylindrical portion and an annular storage section defined therebetween;
   a plurality of flat cables wound within said storage section, each of said plurality of flat cables having a first portion wound in a first direction, a second portion wound in a second direction and a turned back portion connecting the first and second portions, opposing ends of the plurality of flat cables are respectively fixed to said inner cylindrical portion and said outer cylindrical portion; and
   a moving body rotatably disposed within said storage section and having a plurality of openings through which the turned-back portion of said plurality of flat cables pass, said moving body having a cable retaining portion disposed in a position outside of the turned-back portion of one of said plurality of flat cables, the cable retaining portion having a surface corresponding to an outer contour shape of the turned-back portion of the one of the plurality of flat cables and shaped to prevent buckling of the turned-back portion of the one of the plurality of flat cables;
   wherein a width in a circumferential direction of one of said openings is smaller than a width of other of said openings.

2. A rotatable connector according to claim 1, wherein said openings are substantial equally spaced along the circumferential direction of said moving body.

3. A rotatable connector comprising according to claim 1, wherein a joint is provided in said inner cylindrical portion where one end of each of said flat cables are collected in one place.

4. A rotatable connector comprising according to claim 1, wherein one of said plurality of openings is formed by a roller rotatable mounted on the movable body and a fixed cylinder mounted on the movable body.

5. A rotatable connector comprising according to claim 1, wherein said moving body comprises a first cable retaining portion within a first opening of said plurality of openings and in a position outside of said turned-back portion of a first of said cables and a second cable retaining portion within a second opening of said plurality of openings and in a position outside of said turned-back portion of a second of said cables.

6. A rotatable connector comprising according to claim 1, wherein said cable retaining portion is formed integrally with a fixed post that is fixed on the movable body.

7. A rotatable connector comprising according to claim 1, wherein the cable retaining portion has a surface curved to complementarily correspond to the outer contour shape of the turned-back portion of the one of the plurality of flat cables.

8. A rotatable connector comprising according to claim 7, wherein the cable retaining portion has a projection disposed proximate to an inner circumferential wall of the outer cylindrical portion and extending in a circumferential direction of the outer cylindrical portion, the projection having a radially inner surface that is curved to complementarily correspond to the outer contour shape of the turned-back portion of the one of the plurality of flat cables.

9. A rotatable connector comprising according to claim 7, wherein the cable retaining portion has a projection disposed proximate to an outer circumferential wall of the inner cylindrical portion and extending in a circumferential direction of the inner cylindrical portion, the projection having a radially outer surface that is curved to complementarily correspond to the outer contour shape of the turned-back portion of the one of the two flat cables.

10. A rotatable connector comprising:
a first housing having an outer cylindrical portion;
a second housing rotatably attached on said first housing and having an inner cylindrical portion arranged co-axially with said outer cylindrical portion and an annular storage section defined therebetween;
exactly two flat cables wound within said storage section, each of said two flat cables having a first portion wound in a first direction, a second portion wound in a second direction and a turned back portion connecting the first and second portions, opposing ends of the two flat cables are respectively fixed to said inner cylindrical portion and said outer cylindrical portion; and
a moving body rotatably disposed within said storage section and having two openings through which the respective turned-back portions of said two flat cables pass, said moving body having a cable retaining portion disposed in a position outside of the turned-back portion of one of said two flat cables, the cable retaining portion having a surface shaped to correspond to an outer contour shape of the turned-back portion of the one of the two flat cables and shaped to prevent buckling of the turned-back portion of the one of the two flat cables;
wherein a width in a circumferential direction of one of said two openings is smaller than a width of another of said two openings.

11. A rotatable connector comprising according to claim 10, wherein said two openings are substantially equally spaced along the circumferential direction of the moving body.

12. A rotatable connector comprising according to claim 10, wherein a joint is provided in said inner cylindrical portion where one end of each of said two flat cables are collected in a single location.

13. A rotatable connector comprising according to claim 10, wherein one of said two openings is formed by a roller rotatably mounted on the movable body and a fixed cylinder mounted on the movable body.

14. A rotatable connector comprising according to claim 10, wherein said moving body comprises a first cable retaining portion within a first opening of said two openings and in a position outside of said turned-back portion of a first of said two flat cables and a second cable retaining portion within a second opening of said two openings and in a position outside of said turned-back portion of a second of said two flat cables.

15. A rotatable connector comprising according to claim 10, wherein said cable retaining portion is formed integrally with a fixed post that is fixed on the movable body.

16. A rotatable connector comprising according to claim 10, wherein the cable retaining portion has a surface curved to complementarily correspond to the outer contour shape of the turned-back portion of the one of the plurality of flat cables.

17. A rotatable connector comprising according to claim 16, wherein the cable retaining portion has a projection disposed proximate to an inner circumferential wall of the outer cylindrical portion and extending in a circumferential direction of the outer cylindrical portion, the projection having a radially inner surface that is curved to complementarily correspond to the outer contour shape of the turned-back portion of the one of the two flat cables.

18. A rotatable connector comprising according to claim 16, wherein the cable retaining portion has a projection disposed proximate to an outer circumferential wall of the inner cylindrical portion and extending in a circumferential direction of the inner cylindrical portion, the projection having a radially outer surface that is curved to complementarily correspond to the outer contour shape of the turned-back portion of the one of the plurality of flat cables.

19. A rotatable connector comprising;
a first housing having an outer cylindrical portion;
a second housing rotatably attached on said first housing and having an inner cylindrical portion arranged co-axially with said outer cylindrical portion and an annular storage section defined therebetween;
at least one flat cable wound within said storage section, the at least one flat cable having a first portion wound in a first direction, a second portion wound in a second direction and a turned back portion connecting the first and second portions, opposing ends of the at least one flat cable are respectively fixed to said inner cylindrical portion and said outer cylindrical portion; and
a moving body rotatably disposed within said storage section and having a plurality of openings through which the turned-back portion of the at least one flat cable passes, said moving body having a cable retaining portion disposed in a position outside of the turned-back portion of a selected flat cable of the at least one flat cable, the cable retaining portion having a surface corresponding to an outer contour shape of the turned-back portion of the selected flat cable and shaped to prevent buckling of the turned-back portion of the selected flat cable.

20. A rotatable connector comprising according to claim 19, wherein the cable retaining portion has a surface shaped to complementarily correspond to an outer contour shape of the turned-back portion of the selected flat cable.

21. A rotatable connector comprising according to claim 20, wherein the cable retaining portion has a projection disposed proximate to an inner circumferential wall of the outer cylindrical portion and extending in a circumferential direction of the outer cylindrical portion, the projection having a radially inner surface that is curved to complementarily correspond to the outer contour shape of the turned-back portion of the selected flat cable.

22. A rotatable connector comprising according to claim 20, wherein the cable retaining portion has a projection disposed proximate to an outer circumferential wall of the inner cylindrical portion and extending in a circumferential direction of the inner cylindrical portion, the projection having a radially outer surface that is curved to complementarily correspond to the outer contour shape of the turned-back portion of the selected flat cable.

23. A rotatable connector comprising according to claim 19, wherein the plurality of openings are approximately equally spaced along a circumferential direction of the moving body.

24. A rotatable connector comprising according to claim 19, wherein a joint is provided in said inner cylindrical portion where one end of each of the at least one flat cable are collected in one place.

25. A rotatable connector comprising according to claim 19, wherein one of said plurality of openings is formed by a roller rotatably mounted on the movable body and a fixed cylinder mounted on the movable body.

26. A rotatable connector comprising according to claim 19, wherein said moving body comprises a first cable retaining portion within a first opening of said plurality of openings and in a position outside of said turned-back portion of a first flat cable of said at least one flat cable and a second cable retaining portion within a second opening of said plurality of openings and in a position outside of said turned-back portion of a second flat cable of said at least one flat cable.

27. A rotatable connector comprising according to claim 19, wherein said cable retaining portion is formed integrally with a fixed post that is fixed on the movable body.

* * * * *